Jan. 4, 1944. J. A. CHATER 2,338,096
DUSTING MACHINE
Filed Feb. 27, 1940 3 Sheets-Sheet 1

John A. Chater Inventor

By A. S. McDaniel
Attorney

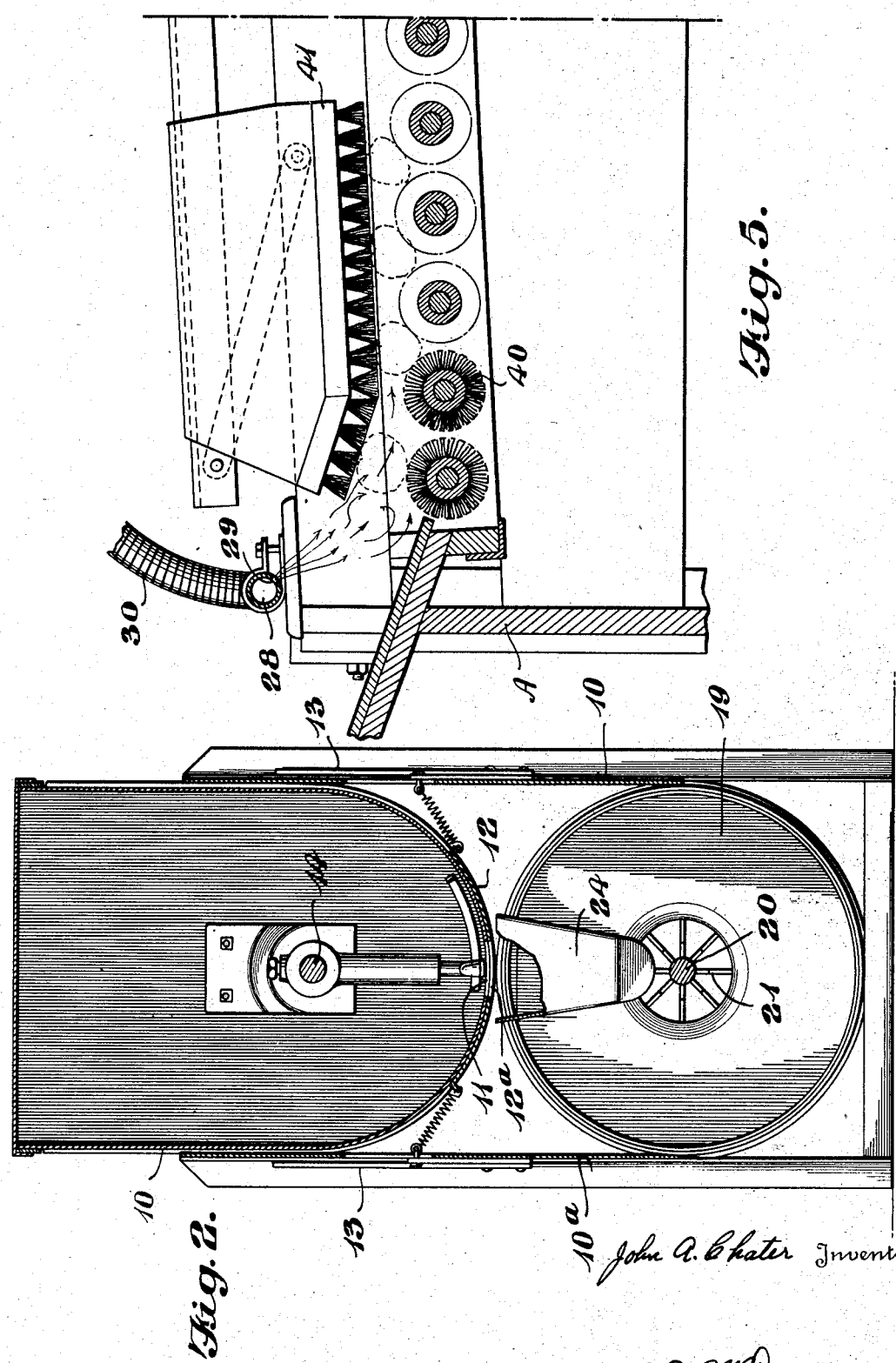

Jan. 4, 1944.                J. A. CHATER                 2,338,096
                            DUSTING MACHINE
                         Filed Feb. 27, 1940           3 Sheets-Sheet 3
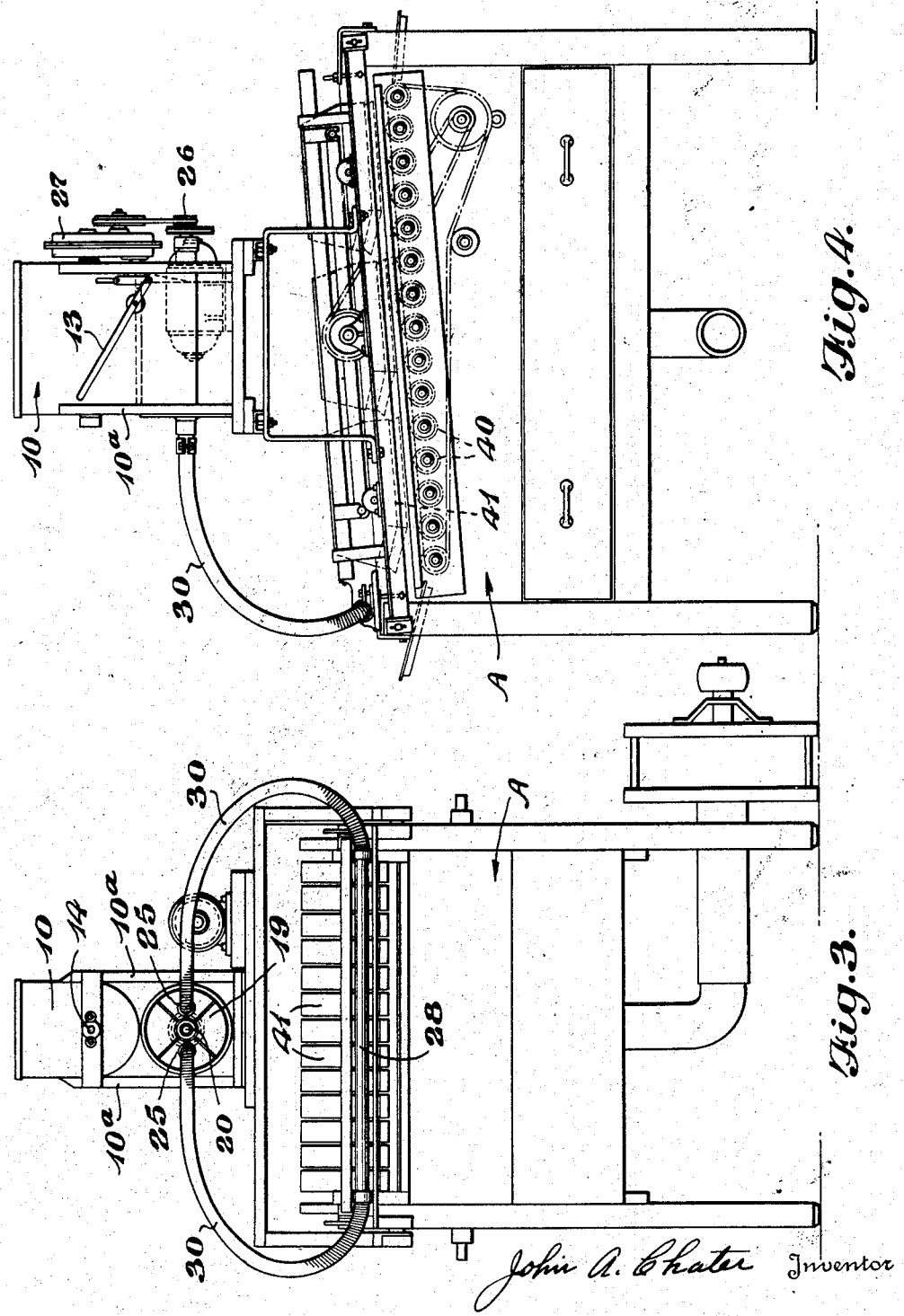

Patented Jan. 4, 1944

2,338,096

UNITED STATES PATENT OFFICE 2,338,096

DUSTING MACHINE

John A. Chater, Medina, N. Y., assignor to Niagara Sprayer and Chemical Co., Inc., Middleport, N. Y., a corporation Application February 27, 1940, Serial No. 321,127

19 Claims. (Cl. 99—168)

The invention relates to a dusting process and apparatus, and more particularly to a process and apparatus especially designed for uniformly dusting peaches or other fruit as they are being conveyed in a flat continuous stream through a fruit brushing machine or the like, such as is disclosed in my co-pending application Serial No. 230,513, filed September 17, 1938.

One of the important objects of the invention is to provide means for handling the very small quantity of dust necessary for preservative purposes and to apply the same admixed with a large quantity of air to objects to be treated, at a substantially uniform rate and with uniform distribution. It is essential that each object receive its proportion of dust but it is also important that no object receive more than its proportionate share. Another object is to supply the air and dust mixture uniformly in a flat continuous stream to an advancing row of articles to be dusted.

It has been found that a very particular problem arises where it is desired to secure a light continuous discharge, which problem is not met with where a larger quantity of dust is employed. Thus when an ordinary hopper, as used in a crop duster, feeds dust it does so at a relatively uniform rate. This is because a sufficient number of agitators are used, or the rate at which the agitator or feed wipers pass over the feed opening is sufficiently rapid to maintain a substantially uniform flow of dust, one of the problems in connection with a crop duster or orchard duster being to see to it that this feed is sufficiently uniform so that there will not be any bad puffing appearance of the exhaust. However, where a very small feed is required this generally requires that the feed opening itself be cut down to a very small size. When the size is reduced beyond a certain minimum for a particular type of dust it has been found that there is a serious tendency for the hole to block up and for the feed to stop or become irregular in operation. This is particularly true if there is present any lint or foreign substance in the dust as is generally the case.

According to the present invention dust is intermittently discharged at predetermined intervals through a small opening of predetermined size, after which the dust is mixed with a relatively large quantity of air in a large mixing chamber, where the air and dust are violently whirled so as to insure complete admixture and to substantially eliminate any puffing action. Within this mixing chamber the intermittent feed is converted into uniform flow, and the mixture, consisting of a relatively large quantity of air and a relatively small quantity of dust, is discharged from the mixing chamber at a predetermined distance from the point of entry of the dust and air. The distance between the point of entry and the point of discharge must be sufficient to insure complete admixture of the air and dust and complete uniformity of flow by the time the dust laden air reaches the discharge point.

The intermittent feed is preferably accomplished, according to the present invention, by using a single feed wiper mounted on a shaft which revolves very slowly within the feed hopper, as compared with the extremely rapid movement of the agitating and mixing elements within the mixing chamber.

After the mixed dust and air leave the mixing chamber they pass into a discharge element designed to uniformly distribute the dust in a plurality of fine streams upon an advancing stream of fruit or other articles to be dusted.

The preferred apparatus for carrying out the invention comprises a number of principal parts including first, a dust container or hopper having a bottom opening near one end of controlled size through which a predetermined quantity of dust is discharged at regulated intervals. The hopper is provided with a very slowly rotating feed means which forces the dust toward the outlet end under pressure while at the same time keeping the dust agitated so as to prevent clogging. In association with the feeding means is a wiper member which intermittently passes over the discharge outlet and removes any obstructions therefrom.

A second principal element is the air and dust mixing chamber which is very large in volume as compared with the quantity of dust introduced thereinto. Air is admitted axially to the mixing chamber and dust from the hopper is supplied intermittently to the entering air stream, after which the air and dust are whirled together violently to produce complete admixture and to eliminate puffing before being discharged from the mixing chamber.

Another important element is an elongated tubular discharge member or pipe communicating with the mixing chamber and provided with a plurality of small openings through which a fine fog is discharged. The tubular discharge member is designed to be placed across the inlet or outlet opening of a fruit brushing machine such as is disclosed for example in my prior application Serial No. 230,513 referred to above. The discharge pipe is preferably connected to a pair of outlets with which the mixing chamber is provided through flexible metal pipes or hose, so that the discharge element may be readily brought into proximity to the inlet or outlet of the brushing machine.

The invention will be more readily understood by reference to the accompanying drawings in which a specific embodiment of the inventive thought is set forth by way of illustration and not by way of limitation.

In the drawings:

Fig. 2 is a view partly in end elevation and partly in vertical section on line 2—2 of Fig. 1, and showing the adjustable outlet from the feed hopper.

Fig. 3 is a front elevation showing the dusting apparatus applied to a fruit brushing machine.

Fig. 4 is a side elevation of the same, and

Fig. 5 is a detailed view on an enlarged scale, partly in section and partly in side elevation showing a portion of the brushing machine and the tubular discharge nozzle, the dusting machine located in close proximity to the inlet end thereof.

Figure 1:
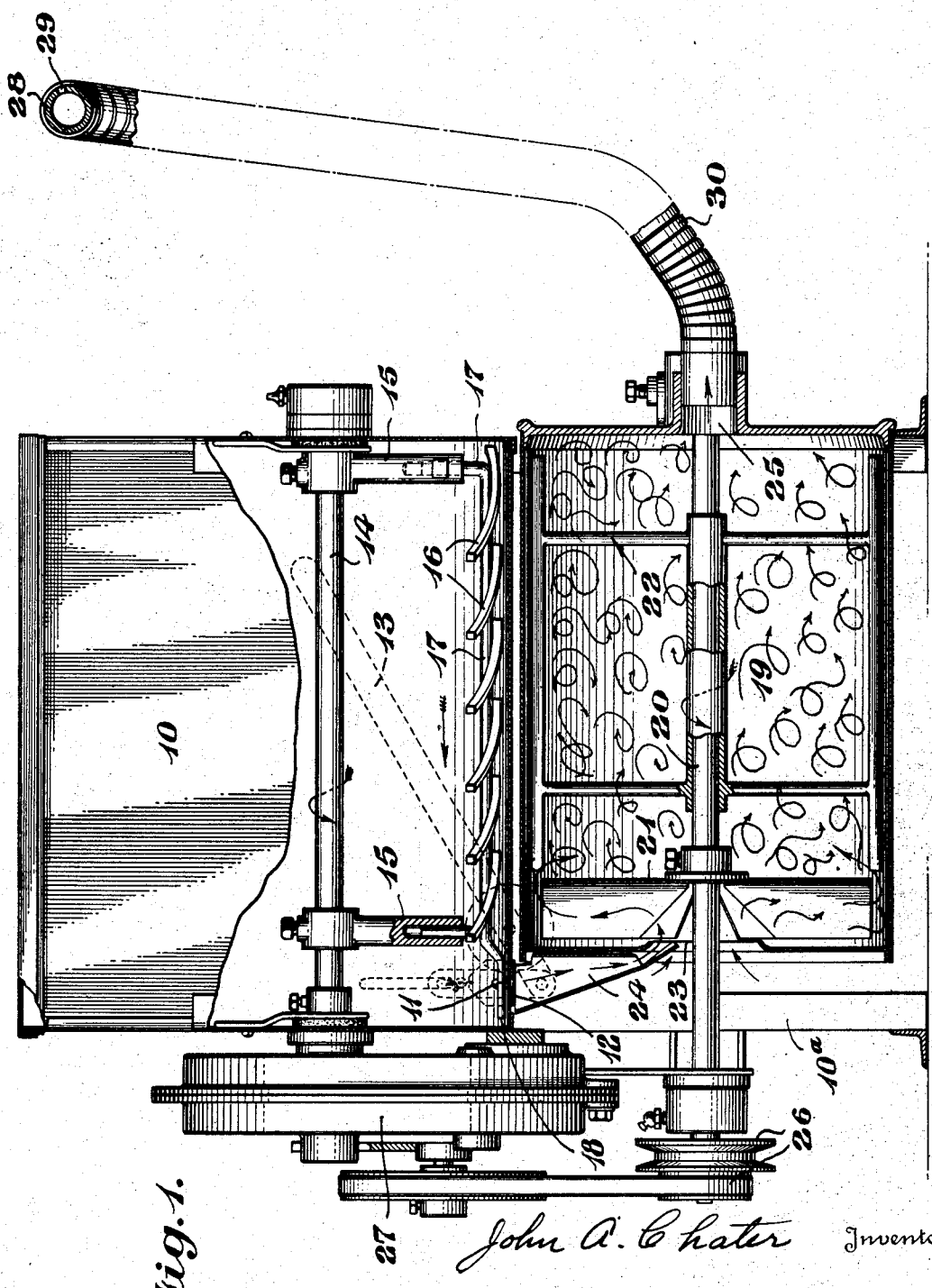
Fig. 1 is a view partly in side elevation and partly in longitudinal vertical section showing the feed hopper, mixing chamber and discharge element of the improved dusting apparatus.

Referring in detail to the drawings the reference numeral 10 denotes a hopper or dust container preferably mounted upon suitable standards 10a, which hopper is provided with a curved bottom substantially semi-circular in profile. The hopper is initially filled with dust to the level indicated. Near one end of the hopper is a bottom discharge opening 11, the effective size of which is controlled by suitable means such as a slide 12 shown as in the form of a strap having a hole 12a therein, the slide being held against the bottom of the hopper by spring tension. The slide may be of the type disclosed in my application Serial No. 136,960, filed April 14, 1937. The position of the hole in the slide may be altered with reference to the position of the bottom opening in the hopper by moving one of a pair of handles 13 thus regulating the feed of dust.

As shown the dust is fed toward the outlet opening by suitable means mounted upon a continuously rotating shaft 14 journaled within the hopper. As shown the feed mechanism is in the form of a rake carried by arms 15, 15 adjustably mounted near opposite ends of the shaft 14. The rake includes a plurality of curved rake teeth 16 set at an angle to a bar or rod 17 which is adjustably connected to the arms 15, 15. One end 18 of the bar 17 extends beyond the rake teeth and serves as a feed wiper. The shaft 14 is designed to be rotated at a relatively low speed, approximately 24–27 R. P. M. and as it revolves the rake teeth force the dust or powder forwardly under pressure toward the discharge aperture. Each time the feed wiper passes across the opening a predetermined quantity of dust is forced therethrough.

Below the dust container or hopper is located an air and dust mixing chamber 19, shown as cylindrical in form, into one end of which air is continuously admitted and dust is intermittently introduced while from the other end mixed dust and air are continuously discharged. Suitable means are provided within the cylindrical chamber for thoroughly mixing the air and dust and advancing the same from the inlet toward the outlet end of the chamber. As shown a power shaft 20 extends axially through the cylinder, being journaled in the ends thereof and a fan runner 21 is mounted on the shaft near the inlet end of the chamber, and an additional member adapted to secure complete admixture of the air and dust and to assist in the whirling movement, is also mounted upon the shaft 20. This additional mixing member comprising the assembly 22 is secured to the shaft just beyond the fan element and extends to the outlet end. Air is admitted axially to the chamber through an inlet 23 and the fan runner serves to draw such air into the chamber and to force it toward outlets at the opposite end. Dust from the hopper 10 is intermittently supplied to the entering air stream through a passage 24 and this dust is completely and thoroughly mixed with the air by means of the fan runner 21 and the auxiliary mixing assembly 22 before the mixture is discharged in continuous streams through a pair of end outlets 25, 25 located at opposite sides of the shaft bearing.

Power for actuating the shaft 20 may be supplied from any suitable source as an electric motor (not shown), being applied through a drive pulley 26. The shaft 14 on which is mounted the intermittent dust feeding mechanism and the feed wiper may be driven from the same source of power as the shaft 20 through suitable reducing mechanism 27. For best results it is desirable that the shaft 20 on which are mounted the fan runner and air and dust mixing instrumentalities should rotate at a relatively rapid rate, approximately 2300 R. P. M. being satisfactory, while the shaft 14 on which are mounted the dust feeding member 16 and the wiper 18 is preferably rotated at a relatively low speed within the range of 24 to 27 R. P. M.

Connected to the outlets 25, 25 of the mixing chamber 19 is a special distributor member which is adapted to discharge dust and air in the form of a fog through a plurality of outlet openings. As shown the distributor is in the form of a continuous tubular member, including a straight portion 28 having a plurality of small aligned discharge apertures 29 therein and a pair of flexible hose members 30, 30 which connect with the outlets 25, 25. Preferably the members 30, 30 are in the form of flexible metal tubes so that the distributor may be placed in any desired position on the level with, above, or below the mixing chamber. The straight portion 28 of the distributor is preferably in the form of a rigid tube and may be rotated axially so as to bring the line of apertures 29 into any desired angular position.

The distributing member may be employed for supplying a preservative dust such as sulphur or the like to peaches or other fruit mounted upon the carrier of a fruit brushing machine, generally designated at A, such as that disclosed in my application Ser. No. 230,513, as illustrated in Figs. 3, 4 and 5, whereby the fruit is conveyed in a flat continuous stream into proximity to the straight portion 28 of the distributor member from the apertures 29 of which dust is issuing in the form of a fine fog or mist, thereby insuring a light but uniform coating of preservative upon the fruit. Owing to the flexibility of the connecting arms the distributor may be brought into parallel relation to the moving stream of fruit and may be rotated axially to the proper angular position, thereby insuring uniformity of distribution. The fruit brushing machine carries the fruit in a flat stream and partially encloses the fruit while being brushed. The tubular distributing member may be placed transversely across the stream of fruit close to the point at which the fruit enters the enclosure or adjacent the point at which the fruit leaves the enclosure. The fruit brushing machine includes fruit carrying and brushing elements comprising a plurality of transverse rotating brushes 40 on a lower level and yielding fruit contacting elements 41 positioned above the brushing elements and partially enclosing the fruit being brushed. It will be noted that the dusting machine may be set above the brushing machine as shown in Figs. 3, 4 and 5 or the duster may be set at a lower level as indicated in Fig. 1 and the discharge pipe positioned upwardly.

The dusting machine as herein described is capable of continuously discharging a very small quantity of dust producing the effect of a fine fog which is sometimes difficult to detect with the eye as it comes through the minute holes 29 in the discharge pipe. In order to make an ordinary duster feed such a small quantity of dust it would be necessary to use an extremely fine opening or feed hole. This might be on the order of $\frac{1}{16}$ of an inch in diameter or the like. It has been found that a hole as small as this will not function properly but will clog up especially if any lint or foreign matter is present in the dust. The present device, however, will discharge an extremely small quantity of dust owing to the intermittent feed and the slow rate at which the agitator shaft 14 is revolved, this being from 24 to 27 R. P. M. and providing from 24 to 27 impulses to the dust per minute. Accordingly it is possible to open the discharge outlet from the hopper considerably more than would be possible if there were a larger number of feed wipers or if the agitator shaft were revolved at a greater speed. By the use of a single feed wiper 18 and rotating the shaft 14 at slow speed the dust is discharged at relatively long intervals into the air stream entering the mixer. In operation it has been found that from ½ to 1 teaspoon of dust is dumped through the discharge opening 11 at each revolution of the wiper and no further dust will be discharged until the feed wiper comes around again on the next revolution. As this dust is fed into the mixing chamber 19 the fan 21 and auxiliary mixing element 22 produce a vortex which tends to even out the discharge of dust. That is to say the mixing elements thoroughly mingle the air and dust within the large chamber 19 and by the time the mixture has reached the outlet end the flow of dust is no longer intermittent but is continuous owing to the fact that the dust particles are thoroughly mingled with the air.

By the use of the present device spoilage of fruit after packing may be completely eliminated. For example, brown rot, a disease that attacks peaches even after packing, may be prevented. A thin even coating of sulphur dust such as may be supplied by the present device protects the fruit against possible loss from this disease. The dust is easily, evenly and harmlessly applied by the dusting machine. Being particularly designed to operate in connection with peach sizing and brushing equipment it delivers through the flexible tubes and perforated discharge pipe a thin smoke-like discharge of sulphur dust at the entrance to or exit from the brushes. Thorough and even distribution is insured according to the present unique construction whereby poundage may be accurately regulated to deliver from three to ten pounds of dust per hour, depending on the position of the slide which controls the discharge outlet from the hopper. Fruit passing through the brushing equipment which is supplied with dust from the present device has the same appearance as fruit which has not been dusted but a sufficient coating of sulphur dust has been applied to prevent normal development of brown rot infection. The coating, however, is practically invisible.

The invention has been described in detail for the purpose of illustration but it will be obvious that modifications and variations may be resorted to without departing from the spirit of the invention.

I claim:

1. A dusting process which comprises intermittently supplying dust to an enlarged mixing chamber, thoroughly mixing the dust with air in said chamber, and continuously discharging the mixture under pressure from said chamber through a restricted orifice to articles to be dusted.

2. A process for dusting fruit and the like comprising intermittently discharging predetermined quantities of dust from a dust container into a mixing chamber, thoroughly mixing said air and dust, and discharging said mixture in a substantially constant stream of maintained dust content.

3. A process for dusting fruit and the like comprising intermittently discharging predetermined quantities of dust from a dust container into a mixing chamber, thoroughly mixing said air and dust, and discharging said mixture in a substantially constant stream of maintained dust content, and directing the discharged mixture onto articles to be dusted.

4. A process for dusting fruit and the like which comprises conveying fruit in a flat stream past a transversely positioned tubular member having openings in the side toward the fruit, and discharging continuous streams of dust laden air upon said fruit.

5. In a dusting machine, a dust supply chamber and a mixing chamber having a small connecting passage therebetween, means for intermittently feeding dust from the supply chamber to the mixing chamber, said mixing chamber having an air inlet, means for rapidly revolving air and dust within said mixing chamber to thoroughly mingle the same, and a discharge outlet for the mixed air and dust.

6. In a dusting machine, a container for dust, means for intermittently feeding a predetermined amount of dust from said container, an enclosed mixing chamber, an inlet for air into said chamber, means for delivering dust from said container into said mixing chamber, means for rapidly revolving air and dust in said chamber, a discharge outlet from said chamber at a predetermined distance from the axis of revolution of said air and means for causing air to flow thru said container.

7. In a dusting machine, a container for dust, an outlet in said container, means for discharging predetermined amount of dust at predetermined intervals from said outlet, an enclosed mixing chamber, an inlet for air into said chamber, means for delivering dust from said container outlet into said chamber, means for rapidly revolving air and dust in said chamber, a discharge outlet from said chamber at a predetermined distance from the axis of revolution of said air and means for causing air to flow thru said container.

8. In a dusting machine, a cylindrical air and dust mixing chamber, a shaft journaled to revolve substantially at the axis of said chamber, means revolving with said shaft to whirl the air in said chamber, an inlet for air in one end and an outlet for mixed air and dust at the other end of said chamber, a container for dust with an outlet leading to said mixing chamber, means for periodically feeding predetermined quantities of dust from said container into said chamber, and means for causing air to flow thru said chamber.

9. In a dusting device, a cylindrical air and dust mixing chamber, a shaft journaled to revolve substantially at the axis of said chamber, an axial air inlet at one end of said chamber, a fan runner mounted in the chamber on said shaft near said inlet, additional means carried by said shaft for revolving air in the chamber, and an outlet in the end of said chamber opposite said inlet, means for revolving said shaft, a container for dust having a restricted passage leading to said mixing chamber, and means for intermittently discharging predetermined amounts of dust from said container to said mixing chamber.

10. In a dusting machine, a container for dust having a curved bottom, an outlet in said bottom, means for varying the size of said outlet, a shaft parallel to the curved bottom of said container, an agitator with inclined surfaces for forcing the dust to the outlet end of the container, carried by said shaft, a feed wiper carried by said shaft positioned to pass over said outlet as the shaft revolved; a cylindrical mixing chamber, a shaft journaled to revolve substantially at the axis of said chamber, an axial air and dust inlet at one end, a fan runner in the chamber on said shaft adjacent said inlet, additional means carried by said shaft for revolving the air in the chamber, an air and dust outlet in the end of the chamber opposite the inlet, means for revolving the agitator shaft in said container slowly and for revolving the fan shaft in said chamber rapidly whereby relatively heavy intermittent discharges of dust from the container are discharged as a light substantially continuous stream from the mixing chamber.

11. In a dusting machine, a container for dust, a cylindrical air and dust mixing chamber having a shaft journaled to revolve substantially at its axis, means carried by said shaft to revolve air in said container, a combined air and dust inlet at one end and an outlet at the other end of said chamber, means for intermittently feeding predetermined quanities of dust from said container into said chamber thru said inlet, a tube with openings in its exterior for placement adjacent articles to be dusted, flexible means for conveying the discharge from said chamber into said tube, and means for conveying articles to be dusted past said tube.

12. In a dusting machine, a container for dust, an enclosed air and dust mixing chamber, means for whirling air in said chamber to produce a vortex, an inlet for air near the center of the vortex in one wall of the chamber and an outlet at a predetermined distance from the center of the vortex in the opposite wall of the chamber, means for intermittently discharging dust from said container into said vortex and means for progressing air and dust thru said chamber, and means for conveying the discharge from said chamber to articles to be dusted.

13. In a dusting machine, a container for dust, an enclosed air and dust mixing chamber, means for intermittently discharging a quantity of dust in an amount large enough to be easily controlled into said chamber, means for violently mixing the discharge with air in said chamber, an air inlet into said chamber, an outlet from said chamber, means for causing a flow of air thru said chamber from said inlet to said outlet, said outlet being small enough with respect to the volume of air chamber to cause a relatively low velocity of air thru said chamber and a relatively high velocity thru said outlet whereby the controlled intermittent feed of dust is converted into a substantially constant but light discharge.

14. In a device of the character described, means for conveying fruit in a flat stream, a tubular member positioned transversely in proximity to said fruit stream, openings in said tubular member in the side toward the fruit; and means for blowing a stream of dust ladened air into said tubular member.

15. In a fruit brushing machine carrying fruit in a flat continuous stream, means partially enclosing the fruit above and below, a tubular member in proximity to the fruit, openings in the walls of said tubular member and means for blowing a stream of dust into said tubular member for discharge thru said openings.

16. In a fruit brushing machine carrying fruit in a flat stream, means partially enclosing the fruit above and below while being brushed, a tubular member in proximity to the fruit, openings in the walls of the tubular member, means for blowing a stream of dust into said tubular member, and means for exhausting dust ladened air from said partial fruit enclosure.

17. In a fruit brushing machine carrying fruit in a flat stream, means partially enclosing the fruit while being brushed, a tubular member placed transversely across the stream of fruit close to the point at which the fruit enters the enclosure, perforations in the walls of the tubular member, means for blowing a stream of dust thru said tubular member for discharging thru said perforations, and means for exhausting dust ladened air from said enclosures.

18. In a fruit brushing machine carrying fruit in a flat stream, means partially enclosing the fruit while being brushed, a tubular member placed transversely across the stream of fruit close to the point at which the fruit leaves the enclosure, perforations in the walls of the tubular member, means for blowing a stream of dust thru said tubular member for discharging thru said perforations, and means for exhausting dust ladened air from said enclosures.

19. A fruit dusting machine adapted for use in connection with a means for conveying fruit in a flat stream, comprising a mixing chamber for thoroughly mingling air and dust, having a pair of outlets at one end thereof, and a flexible tube having its ends connected to said outlets, and including a straight perforated portion adapted to be brought into proximity with the stream of fruit, whereby the entire stream may be dusted.

JOHN A. CHATER.